United States Patent
Allen

[15] 3,643,838
[45] Feb. 22, 1972

[54] FOOD SEASONER APPARATUS

[72] Inventor: Wilford W. Allen, 323 Vista Pl., Los Angeles, Calif. 90042

[22] Filed: Apr. 27, 1970

[21] Appl. No.: 32,127

[52] U.S. Cl.............................222/161, 222/169, 222/565, 107/43
[51] Int. Cl...........................................A47g 19/24
[58] Field of Search..............107/43, 50; 222/161, 169, 180, 222/191, 196.1, 196.3, 457, 463, 478, 480, 565; 239/102, 374; 209/279, 281, 288, 284, 417, 405, 408; 118/13, 19, 25; 99/238.4

[56] References Cited

UNITED STATES PATENTS

| | | | |
|---|---|---|---|
| 439,563 | 10/1890 | Robinson | 222/169 |
| 1,433,856 | 10/1922 | Smith | 222/161 X |
| 1,188,848 | 6/1916 | Shuch | 209/417 |
| 537,123 | 4/1895 | Mills | 209/281 X |
| 433,438 | 8/1890 | Bellamy | 222/565 X |
| 2,849,157 | 8/1958 | Remien | 222/169 |

Primary Examiner—Robert B. Reeves
Assistant Examiner—Thomas E. Kocovsky
Attorney—J. L. Jones

[57] ABSTRACT

A commercial solid-particle food seasoner has a thin wall right cylinder length, each cylinder end being closed, the cylinder length and the closures cooperatively form the wall of a seasoning container. At least one seasoning filling aperture is formed in the container wall and has a detachable sealing closure. A multiplicity of seasoning-dispensing apertures are disposed in the cylinder length wall area bounded by a minor cylinder arc and the cylinder length. The seasoning container has a shaft coaxially secured to the pair of end closures and a container support shaft mount cooperatively holding the container in a superimposed horizontal position above a food preparation area. A handle secured to the shaft adapts the container to shaking and dispensing the contained seasoning.

3 Claims, 4 Drawing Figures

PATENTED FEB 22 1972        3,643,838

INVENTOR
WILFORD W. ALLEN
BY
AGENT

FOOD SEASONER APPARATUS

BACKGROUND OF THE INVENTION

1. Field of the Invention

The apparatus is a seasoning device particularly suitable for commercial-type seasoning operations, such as salting chickens, french fries and the like in food preparation areas where large volumes of food are prepared.

2. Description of the Prior Art

A search of the prior seasoning art does not disclose pertinent apparatus. Prior art search in Class 99, 107 and 222 disclose early devices related primarily to sprinkling clothes with water prior to ironing and the like.

Elliott, in U.S. Pat. No. 429,609 teaches a cylindrical water-sprinkling device for clothes having multiple apertures distributed completely around the cylinder wall. Fales, in U.S. Pat. No. 711,923, teaches a bluing device for clothes having multiple perforations in and around the external cylinder wall and a solid bluing cartridge disposed inside of the external perforated cylinder. The device is adapted to be immersed in water prior to sprinkling clothes. Price, in U.S. Pat. No. 979,199, teaches a water sprinkler for clothes having multiple perforations in the entire periphery of an external cylinder wall.

SUMMARY OF THE INVENTION

A commercial solid-particle food seasoner apparatus has a thin wall right circular cylinder length and cylinder end closures, all together forming the wall of a seasoning container. At least one seasoning filling aperture is provided in the container wall and the aperture has a detachable sealing closure. A multiplicity of seasoning-dispensing apertures are disposed in the cylinder length wall area bounded by a minor cylinder arc and the cylinder length. A container support shaft is coaxially disposed in the pair of end closures and secured to the closures. A container support shaft mount cooperatively holds the rotative shaft, providing a mount for superimposing the seasoning container above a food preparation area. A handle secured to the rotative shaft adapts the seasoning container to shaking and dispensing the contained seasoning.

Included in the objects of this invention are:

First, to provide a simple, inexpensive seasoning apparatus useful for seasoning large quantities of food at one time.

Second, to provide a simple, inexpensive seasoning apparatus cooperatively adapted to season the automated production of large volumes of food products prepared for direct consumption.

Third, to provide a simple, noncorrosive apparatus for continuously controlling the dosage of a food seasoning applied to table-ready commercially prepared volumes of food products.

Fourth, to provide a simple inexpensive seasoning apparatus suitable for salting large volumes of commercially prepared food products at one instant.

Further objects and advantages of this invention will become apparent in the following description to be read in conjunction with the accompanying drawing.

DESCRIPTION OF THE PREFERRED EMBODIMENT

Figure 1:
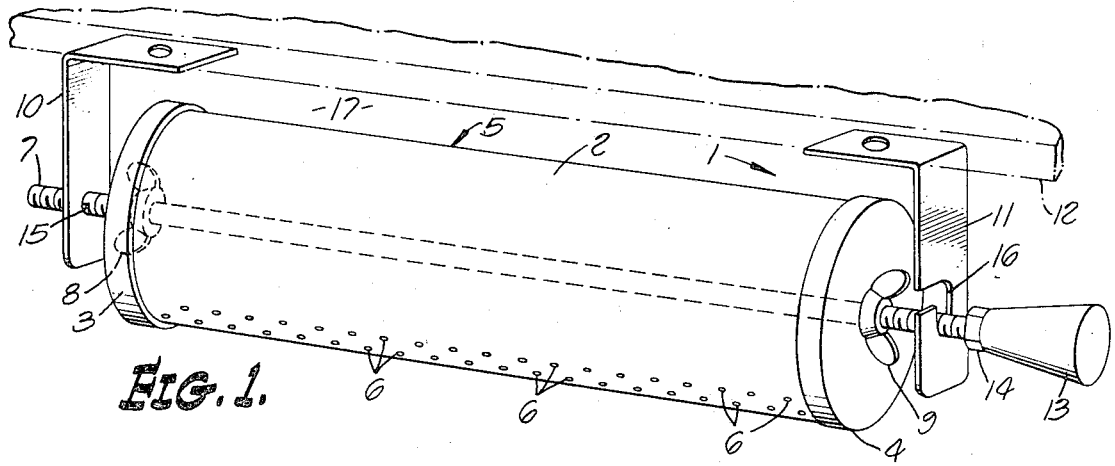
FIG. 1 is a perspective elevational view of one embodiment of the food seasoner apparatus disposed in an operative position, suitably above a food preparation area.

The perspective elevational view in FIG. 1 of the food seasoner apparatus 1 illustrates a thin wall right circular cylinder length 2 having a pair of end cap closures 3 and 4. The seasoning container 5 consists of the cylinder length 2 and the pair of end cap closures 3 and 4. A multiplicity of seasoning-dispensing apertures 6 are shown disposed in rows or random position, as desired. The dimensional size of the apertures 6 is that which is necessary to dispense the seasoning contained in the container 5. Typically the apertures 6 completely penetrate and are disposed over a minor part of the cylinder wall for the desired distance along the cylinder length as required. The threaded rod shaft 7 forms the container support shaft and it is disposed coaxially in the pair of end cap closures 3 and 4, extending beyond both closures, through concentric openings in each closure. The pair of wing nuts 8 and 9 secure the support shaft 7 to the container 5 by compressively locking the end cap closures 3 and 4 in a conventional nut and bolt threaded means. Two container support shaft mounting bracket means 10 and 11 are mounted overhead to a support base 12 by conventional screw fasteners or the like. The mounting shaft 7 is disposed in the opening 15 on the mounting bracket means 10 and the other end of the mounting shaft 7 is placed in the slotted opening 16 of the mounting bracket means 11.

Conventionally the seasoning container 5 is filled with a seasoning such as salt, sugar, pepper, or the like, by removing the container 5 from the support mounting means 10 and 11, removing the wing nut 8 and the one end closure 3 and filling the container with the required seasoning. After replacing the end closure 3 and the wing nut 8, the seasoning container 5 is replaced in the shaft mounting means 10 and 11. In use the freshly prepared food is disposed below the food seasoner 1 and the seasoner spread on the freshly prepared food by oscillating the handle knob 13, secured by the lock nut 14, to manually dispense as much seasoning on the food as required. When seasoning is not required to be dispensed, the seasoning apertures 6 may be disposed up toward the space 17, thus preventing the seasoning from falling through the dispensing apertures 6 by accidental shaking or vibrating the food seasoner.

Figure 2:
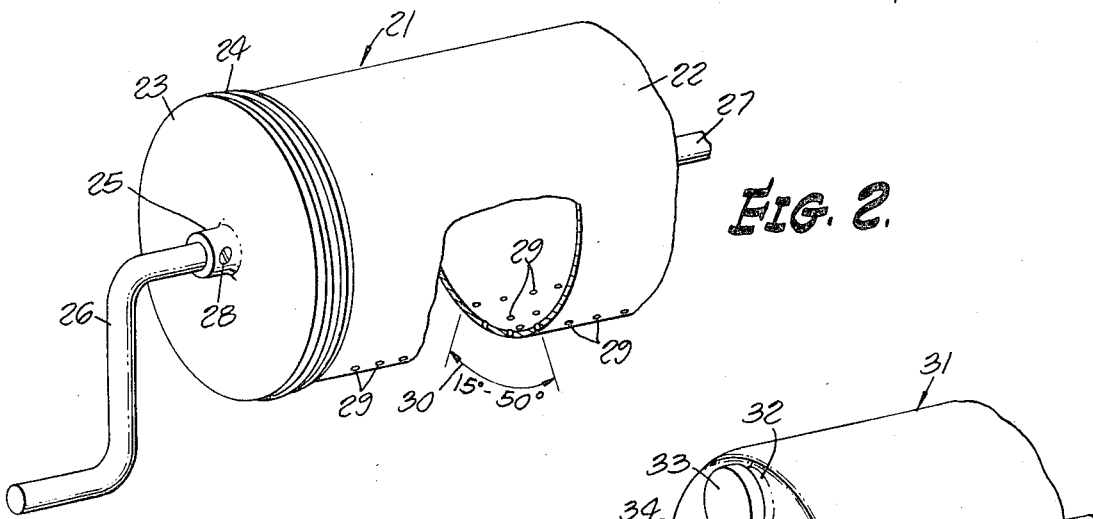
FIG. 2 is fragmentary perspective elevational view of a second modification of the food seasoner apparatus having a threaded end closure in the seasoner container and a crank handle.

FIG. 2 illustrates another perspective elevational and fragmentary view of the second modification of the food seasoner apparatus having the seasoning container 21 which is shown to consist of a thin wall right circular cylinder length 22 having an end closure 23, and a second permanent end closure, not shown. The conventional mating screw thread 24 of closure 23 is threaded on the underlying mating threads of the cylinder 22. A coaxially disposed bearing means 25 is permanently secured to the end closure 23. A crank handle means 26 is shown extending through bearing means 25. The crank handle means 26 merges into the shaft means 27 which extends to the other end of the seasoning container 21. A securing pin 28 or other fastening means mechanically locks the shaft 27 and crank handle 26 to the end closure 23. Seasoning dispensing apertures 29 are shown disposed over a minor arc of the wall of the metal container 22, completely penetrating the thin wall. The minor arc 30 of the cylinder 22 over which the seasoning apertures 29 are disposed is typically 15° to 50° of arc on the cylinder wall and can be an arc value required to dispense the seasoning into the operational area under the conditions of use as a seasoning apparatus. As in the food seasoner 1, the seasoning dispensing apertures 29 extend the required distance along the right circular cylinder length 22. The seasoning container 21 cooperatively comprising the container 22, end closure 23, shaft 27 and crank handle 26, and the like are disposed on a pair of mounting brackets equivalent to the shaft mounting means 10 and 11 of FIG. 1.

Figure 3:
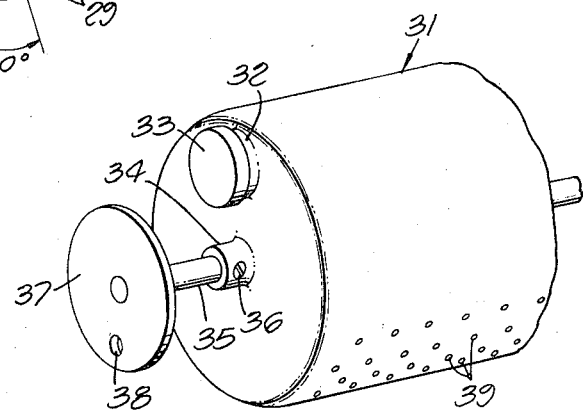
FIG. 3 is a still further fragmentary perspective elevational view of another embodiment of the seasoner container having a one-piece plastic seasoning container construction with a filling aperture located in the cylinder end, and a cam handle means.

FIG. 3 illustrates a still further embodiment of the seasoner container being a plastic one-piece thin wall container 31, having a filling aperture 32 closed by a removable aperture closure 33. The integrally molded support bearing 34 extends from the one-piece container 31. A support shaft 35 is secured by a fastener means 36 to the container 31. A cam handle means 37 is secured to the shaft 35 and a cam opening 38 can be cooperatively adapted to automated machine operation in an automated cooking production line. The seasoning-dispensing apertures 39 penetrating through 31 again can be random or aligned, with opening dimensions required to dispense the seasoning. Again the minor cylinder arc of the container 31 in which the seasoning-dispensing apertures 39 are found is typically from 15° to 50° of arc. For convenience in filling the container 31 the aperture closure 33 can be a snap fit cover over the filling aperture 32, as is well known in present day container construction.

Figure 4:
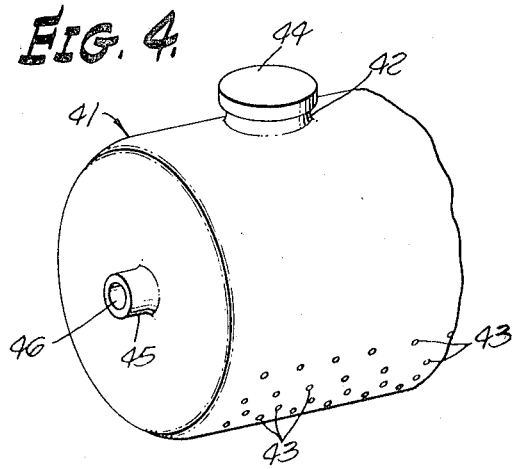
FIG. 4 represents still another embodiment in a fragmentary perspective elevational view of a seasoner container having the filling aperture disposed on the cylinder wall.

FIG. 4 illustrates a still further embodiment of this invention in which the seasoning container 41 is again a one-piece thin wall molded plastic container or the like, having a filling aperture 42 oppositely disposed with respect to the seasoning-dispensing apertures 43. An aperture closure or cap 44 can have a snap fit covering the filling aperture 42. The molded bearing 45 has an opening 46 for the rotative shaft required in the complete food seasoner.

It is essential for the operation of the food-seasoning apparatus that the components illustrated not be corroded by the seasoning contained in the apparatus. It is typical that the thin wall cylinder lengths 2 and 21 be aluminum, stainless steel or the like, or they can be made of opaque or transparent plastic, such as polyethylene, polypropylene, and the like. Although the containers 31 and 41 are shown to be plastic, they could likewise be made of thin wall sheet metal such as aluminum, stainless steel, tin-plated steel and the like. Screw closures are fully cooperatively equivalent for the filling apertures 32 and 42, as is conventional.

In the large-scale production of commercially prepared foods in quick service restaurants, snack bars and the like, where rapid volume production is important, it is very desirable to dispense selected seasonings such as salt, sugar or the like in controlled dosages over large areas of freshly prepared foods. By controlling the shaking, vibration, or oscillation of the seasoning container 5, 21, 31 and 41, or the like, it is possible to dispense the seasoning in the desired amounts. As illustrated in FIG. 3, it is taught that the seasoning container can be secured to cam handle means which can be controlled to dispense seasoning at the required continuous rate or at intervals, as automated production requires.

Obviously many modifications can be made in this improvement in a food seasoner apparatus. It is therefore understood that within the scope of the appended claims, the invention may be practiced otherwise than as specifically described.

I claim:
1. A commercial solid particle food seasoner comprising:
   a. a thin wall, right circular cylinder length,
   b. a pair of end closures, each one of said end closures oppositely disposed at one cylinder length end and sealing a cylinder end, said pair of closures and said cylinder length cooperatively forming the wall of a seasoning container,
   c. at least one filling aperture cooperatively disposed in said container wall, adapted to facilitate filling said container with seasoning,
   d. a detachable closure sealing said filling aperture,
   e. a multiplicity of seasoning-dispensing apertures disposed through the cylinder length wall, adapted in aperture size to dispense a seasoning, said dispensing apertures cooperatively disposed in the cylinder wall area bounded by a minor cylinder arc and said cylinder length,
   f. container support shaft means coaxially disposed in said pair of end closures, and secured thereto,
   g. container support shaft mounting means cooperatively adapted to secure said shaft means in a superimposed horizontal position above a food preparation means, and
   i. handle motion means secured to said container support shaft means, adapted to rotate said container, dispensing said contained seasoning.

2. In a food seasoner of claim 1, the modification wherein at least one said end closure is detachable from said cylinder length.

3. In a food seasoner of claim 2, the modification wherein at least one said end closure is cooperatively detachably secured to said cylinder length by compressive container support shaft means.

* * * * *